United States Patent [19]
Nakata

[11] Patent Number: 4,954,898
[45] Date of Patent: Sep. 4, 1990

[54] WIPE PATTERN GENERATOR

[75] Inventor: Tetsuro Nakata, Kanagawa, Japan

[73] Assignee: Sony Corporation, Tokyo, Japan

[21] Appl. No.: 345,229

[22] Filed: May 1, 1989

[30] Foreign Application Priority Data

| May 7, 1988 | [JP] | Japan | 63-110743 |
| May 17, 1988 | [JP] | Japan | 63-120234 |
| Jun. 14, 1988 | [JP] | Japan | 63-146211 |

[51] Int. Cl.$^5$ .............. H04N 5/272; H04N 7/01; H04N 9/64
[52] U.S. Cl. ................. 358/183; 358/22; 358/140
[58] Field of Search .............. 358/22, 140, 183

[56] References Cited

U.S. PATENT DOCUMENTS

| 4,580,164 | 4/1986 | Andrieu et al. | 358/140 |
| 4,660,043 | 4/1987 | Lachaize et al. | 358/140 |
| 4,729,029 | 3/1988 | Henri et al. | 358/183 |
| 4,811,102 | 3/1989 | Chaplin | 358/183 |
| 4,823,183 | 4/1989 | Jackson et al. | 358/22 |
| 4,855,834 | 8/1989 | Cawley et al. | 358/22 |

*Primary Examiner*—John K. Peng
*Attorney, Agent, or Firm*—Lewis H. Eslinger; Jay H. Maioli

[57] ABSTRACT

In a wipe pattern generator for generating a wipe pattern signal on the basis of wipe pattern data stored in a memory, data indicating a contour of a wipe pattern expressed by polar coordinates is stored in the memory, angle data and distance data indicating a position of each pixel on a monitor apparatus in a polar coordinate system is generated, data indicating the contour of the wipe pattern is read out from the memory on the basis of the angle data and a wipe pattern signal is formed on the basis of the read angle data and the distance data.

14 Claims, 11 Drawing Sheets

| Address Aθ | Distance Data r |
|---|---|
| 0 | 300 |
| 1 | 305 |
| 2 | 309 |
| ⋮ | ⋮ |
| 4095 | 297 |

WIPE PATTERN GENERATOR

BACKGROUND OF THE INVENTION

1. Field of the Invention

The present invention relates generally to wipe pattern generators and, more particularly, to a wipe pattern generator in which data expressed by polar coordinates to indicate a shape of a wipe pattern is stored in a memory and a wipe pattern signal is generated based on the data thus stored in the memory.

2. Description of the Prior Art

An official gazette containing Japanese laid-open patent application No. 56-65575 discloses a special effect signal generating apparatus. According to this previously-proposed special effect signal generating apparatus, various patterns such as a circle, a diamond and so on are drawn on a monitor screen, and a video signal different from a video signal displayed on the outside of the drawn pattern is displayed on the inside thereof. The above prior-art special effect signal generating apparatus includes a wipe pattern generator in order to generate wipe patterns such as a circle, a diamond and the like.

In the prior-art wipe pattern generator, data indicating a vertical fundamental wipe pattern and data indicating a horizontal fundamental wipe pattern are stored in vertical and horizontal fundamental wipe pattern memories, respectively. When a wipe pattern signal is generated, the data indicating the vertical fundamental wipe pattern and the data indicating the horizontal fundamental wipe pattern are read out from the vertical and horizontal fundamental wipe pattern memories on the basis of vertical and horizontal synchronizing signals of a video signal. Then, the data thus read are compared with a fader level, following which they are mixed with each other and thereby generated as a wipe pattern signal.

In the prior-art wipe pattern generator, however, data used to form a wipe pattern are divided into vertical and horizontal directions data and are then stored in the memories as described above. This makes it difficult to generate a wipe pattern of a complex shape, to radially modulate a wipe pattern and to rotate a wipe pattern.

OBJECTS AND SUMMARY OF THE INVENTION

It is an object of the present invention to provide an improved wipe pattern generator which can remove the above-mentioned defects encountered with the prior art.

More specifically, an object of the present invention is to provide a wipe pattern generator of a simplified arrangement which can generate a wipe pattern of complex shape.

Another object of the present invention is to provide a wipe pattern generator which can generate a wipe pattern signal in which the level of a soft wipe pattern is gradually changed near a contour of a wipe pattern within a predetermined range.

Still another object of the present invention is to provide a wipe pattern generator which can radially modulate a wipe pattern with ease.

Still another object of the present invention is to provide a wipe pattern generator which can rotate a wipe pattern with ease.

In order to accomplish the above objects of the present invention, data expressed by polar coordinates to indicate a contour of a wipe pattern is stored in a memory. From angle data and distance data indicating the position of pixels on a display apparatus according to the polar coordinate system, the data indicating the contour of the wipe pattern is read from the memory on the basis of the angle data, and the thus read angle data and the distance data are used to generate a wipe pattern signal.

In order to accomplish another object of the present invention, a wipe pattern generator for generating a wipe pattern signal on the basis of wipe pattern data stored in a memory means, comprising:

(a) memory means for storing data expressed by polar coordinates to indicate a contour of a wipe pattern;

(b) pixel position designating means for generating angle data and distance data indicating a position of each pixel of a display means in a polar coordinate system; and (c) means for forming a wipe pattern signal on the basis of data indicating a contour of said wipe pattern derived from said memory means based on said angle data and said distance data.

In order to accomplish other objects of the present invention, a wipe pattern generator for generating a wipe pattern signal on the basis of wipe pattern data stored in a memory means, comprising:

(a) memory means for storing first angle data and first distance data in a predetermined relationship, said first angle data indicating an angle between an imaginary reference straight line passing through a reference point within a wipe pattern and a predetermined point on the contour of said wipe pattern and an imaginary straight line passing through said reference point and a given point on the contour of said wipe pattern, said first distance data indicating a distance between said reference point and said given point;

(b) pixel position designating means for generating second distance data between each pixel of the display means for displaying said wipe pattern and said reference point and second angle data indicating an angle between an imaginary straight line passing through said reference point and each pixel and said imaginary reference straight line; and (c) means for forming a wipe pattern signal from said first data derived from said memory means on the basis of said second angle data and second distance data.

In order to accomplish further objects of the present invention, a wipe pattern generator for generating a wipe pattern signal on the basis of wipe pattern data stored in a memory means, comprising:

(a) memory means for storing first angle data and first distance data in a predetermined relationship, said first angle data indicating an angle between an imaginary reference straight line passing through a reference point within a wipe pattern and a predetermined point on the contour of said wipe pattern and an imaginary straight line passing through said reference point and a given point on the contour of said wipe pattern, said first distance data indicating a distance between said reference point and said given point;

(b) pixel position designating means for generating second distance data between each pixel of the display means for displaying said wipe pattern and said reference point and second angle data indicating an angle between an imaginary straight line passing through said reference point and each pixel and said imaginary reference straight line;

(c) adding means for adding a predetermined offset value to said second angle data; and (d) forming means for a wipe pattern signal from said first distance data derived from said memory means on the basis of an output signal from said adding means and said second distance data.

The above, and other objects, features and advantages of the present invention, will be apparent in the following detailed description of preferred embodiments of the invention when read in conjunction with the accompanying drawings, in which the same reference numerals are used to identify corresponding parts in the several views.

DETAILED DESCRIPTION OF PREFERRED EMBODIMENTS

The present invention will hereinafter be described in detail with reference to the drawings.

Referring to the drawings in detail and initially to FIG. 1 thereof, a principle of the present invention, namely, how to express a wipe pattern by polar coordinates, will be explained in order to understand the present invention clearly.

Figure 1:
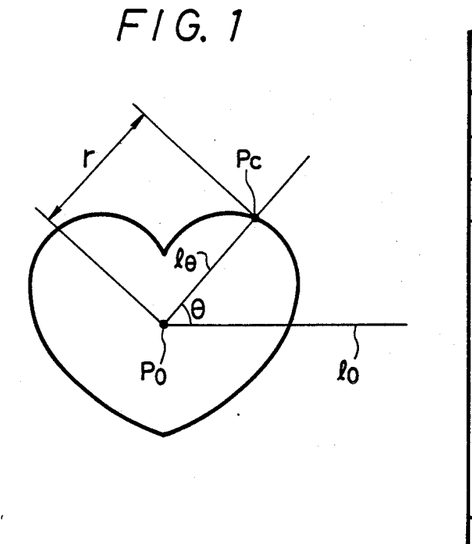
FIG. 1 is a schematic diagram used to explain how a wipe pattern is expressed by polar coordinates according to the present invention.

Referring to FIG. 1, it will be seen that a wipe pattern WP is drawn as a heart shape, by way of example, in which a reference point $P_0$ thereof is located within the wipe pattern WP. The position of the reference point $P_0$ is selected so that all straight lines extended between the reference point $P_0$ and the contour of the wipe pattern WP cross only one point on the contour of the wipe pattern WP. A reference line $l_0$ is extended from the reference point $P_0$ to the right-hand direction in the drawing. A straight line $l_\theta$ is extended from the reference point $P_0$ to the contour of the wipe pattern WP and intersects the contour of the wipe pattern WP at an intersection Pc thereof. Polar coordinate data of the wipe pattern WP are formed by an angle $\theta$ between the straight line $l_\theta$ and the reference line $l_0$ and by a distance r between the reference point $P_0$ and the intersection Pc.

Figure 2:
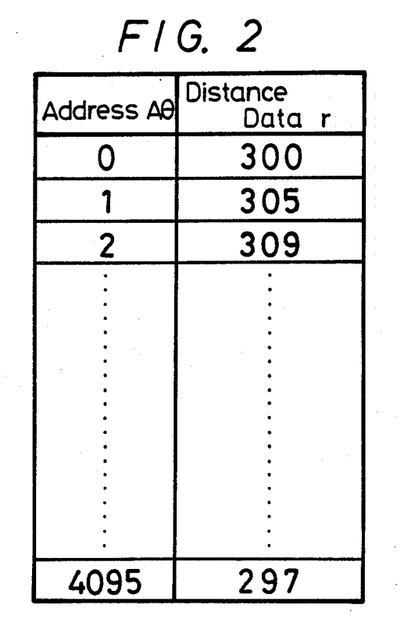
FIG. 2 is a schematic diagram showing an example of a pattern memory used in the present invention.
Figure 3:
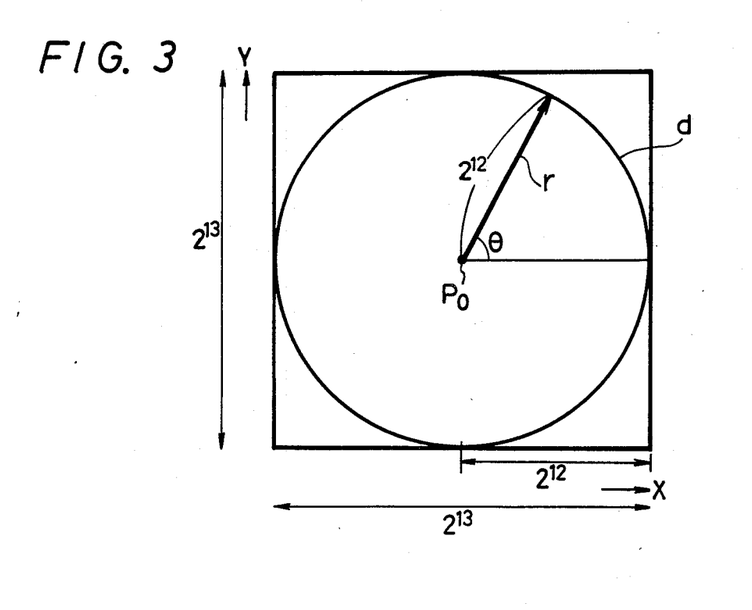
FIG. 3 is a schematic diagram used to explain the storage capacity of the pattern memory of the present invention.

FIG. 2 is a table which shows an example of polar coordinate data in which the angle $\theta$ shown in FIG. 1 is stored as an address $A_\theta$ and the distance r between the reference point $P_0$ and the intersection Pc shown in FIG. 1 is stored as data. In a case like FIG. 2, the address data $A_\theta$ can be expanded up to $2^{12}=4096$ addresses. In this case, the address $A_\theta$ is $2^{12}$ and as shown in FIG. 3, it is assumed that the orthogonal coordinates (x, y) are (13 bits, 13 bits). If these orthogonal coordinates are expressed in a polar coordinate system, then the distance data r is presented as a radius of a circle which internally contacts with a square of $12^{13} \times 12^{13}$ and the distance data r becomes 12 bits accordingly. Thus, the storage capacity of the pattern memory is expressed as $2^{12} \times 12 = 48$ kbits.

Figure 4:
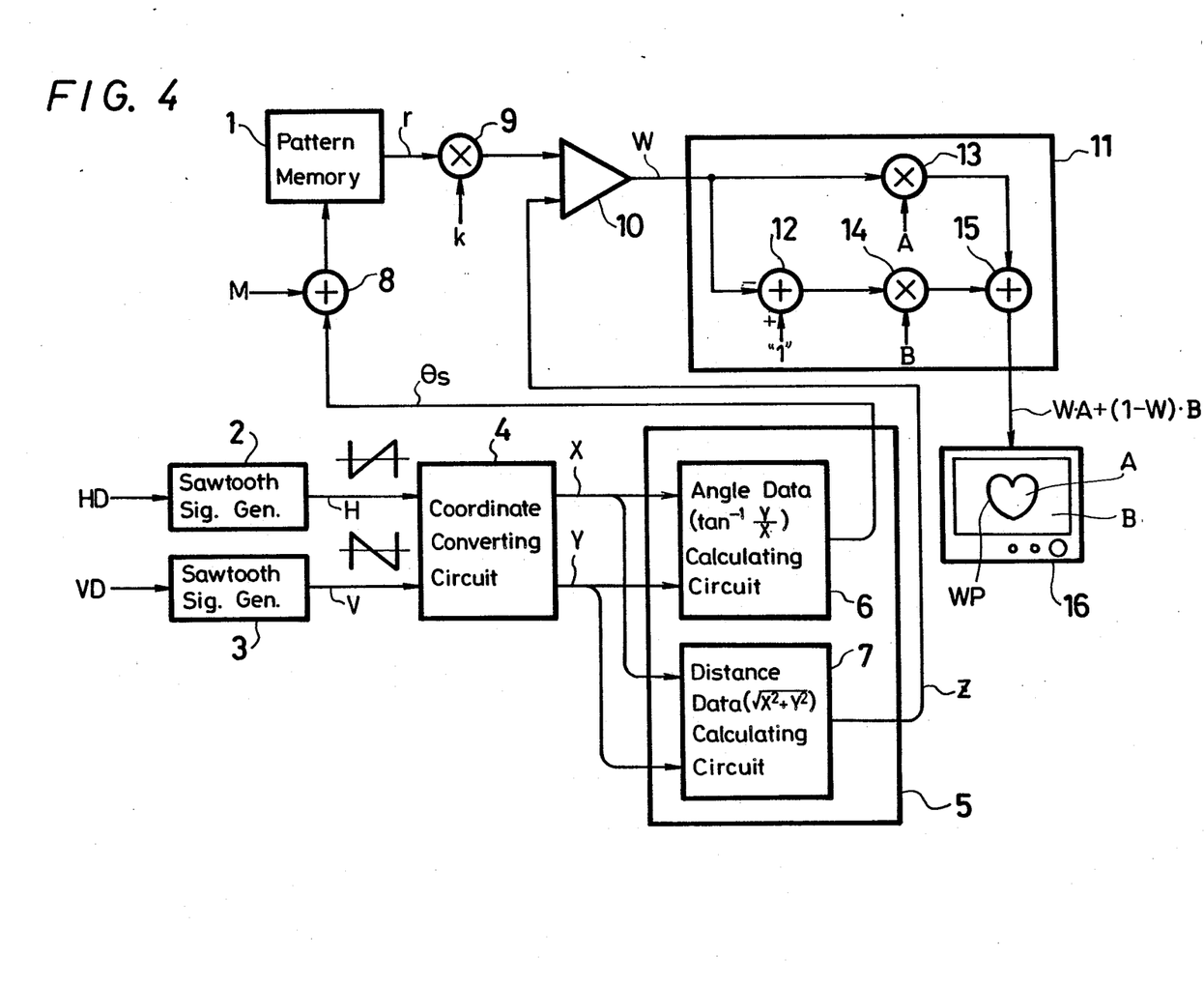
FIG. 4 is a block diagram showing an embodiment of a wipe pattern generator according to the present invention.

FIG. 4 is a schematic block diagram showing an embodiment of a circuit arrangement of the wipe pattern generator according to the present invention, wherein the above-mentioned polar coordinate data memory is used as a pattern memory represented by reference numeral 1.

Referring to FIG. 4, it will be seen that horizontal and vertical synchronizing signals HD and VD synchronized with reference signals such as a system clock or the like are supplied to sawtooth generating circuits 2 and 3, respectively. The sawtooth generating circuits 2 and 3 respectively generate sawtooth signals H and V which are supplied to a coordinate converting circuit 4.

In the coordinate converting circuit 4, the sawtooth signals H and V are converted to (X, Y) data which indicate each pixel on a monitor screen in the orthogonal coordinate system where the above-mentioned reference point $P_0$ is used as an original point. The signals X and Y, converted to the coordinate values, are respectively supplied to an angle calculating circuit 6 and a distance calculating circuit 7 which constitute a polar coordinate converting circuit 5. The angle calculating circuit 6 calculates angle data $\theta_s = \tan^{-1}(Y/X)$ from the signals X and Y, and supplies resultant angle data $\theta_s$ to an adding circuit 8. The adding circuit 8 adds, when a wipe pattern is rotated by an offset value, an address offset value M indicating the rotation angle data for the angle data $\theta_s$. The angle data $\theta_s$ is supplied from the adding circuit 8 to the pattern memory 1 as address data, following which the distance data r corresponding to the angle data $\theta_s$ is read out of the pattern memory 1. The distance data r thus read is supplied through a multiplying circuit 9 to one input terminal of a comparing circuit 10. The comparing circuit 10 receives at the other input terminal thereof the distance data calculated by the distance calculating circuit 7 which is the distance between the reference point $P_0$ and a point defined by the coordinates (X, Y), namely, $\sqrt{X^2+Y^2}$. The comparing circuit 10 compares the distance data $\sqrt{X^2+Y^2}$ and the afore-noted distance data r. If $r \geq \sqrt{X^2+Y^2}$, then it is determined that the point defined by the coordinates (X, Y) lies within the inside of the wipe pattern WP. The comparing circuit 10 therefore generates "1" as a wipe pattern signal W. If $r < \sqrt{X^2+Y^2}$, it is determined that the point defined by the coordinates (X, Y) is located outside the wipe pattern WP, 50 the comparing circuit 10 generates "0" as the wipe pattern signal W. The wipe pattern signal W is supplied to an adding circuit 12 and a multiplying circuit 13 which constitute a video mixing circuit 11. In the adding circuit 12, the wipe pattern signal W is processed to become a signal 1−W, and this signal 1−W is then supplied to a multiplying circuit 14, in which it is multiplied with a video signal B, thereby generating a signal (1−W)·B. The signal (1−W)·B is supplied to an adding circuit 15. The multiplying circuit 13 multiplies the wipe pattern signal W with a video signal A to generate a signal W·A. The signal W·A is supplied to the adding circuit 15, in which it is added to the above-mentioned signal (1−W)·B and is thereby generated as a signal W·A+(1−W)·B. Thus, when the comparing circuit 10 generates "1" as the wipe pattern signal, then the video mixing circuit 11 generates the video signal A, while when the comparing circuit 10 generates "0" as the wipe pattern signal, the video mixing circuit 11 generates the video signal B. When the video signal from the video mixing circuit 11 is supplied to and displayed on a monitor 16, the video signal A is therefore displayed on the inside of the wipe pattern WP and the video signal B is displayed outside the wipe pattern WP.

When the wipe pattern WP is increased or reduced in size, a wipe pattern of a desired magnification can be provided by adjusting a magnification factor k supplied to the multiplying circuit 9 to multiply the distance r with coefficient k.

In order to store a lot of wipe patterns in the pattern memory 1 shown in FIG. 4, it is proposed to increase the storage capacity of the pattern memory 1. This proposal is however not so powerful because a memory of large capacity generally requires plenty of access time, which causes the processing speed of the wipe pattern generator to be lowered. This limits the storage capacity of the pattern memory 1 and also limits the number of wipe patterns WP that can be stored in the pattern memory 1 as a result.

Figure 5:
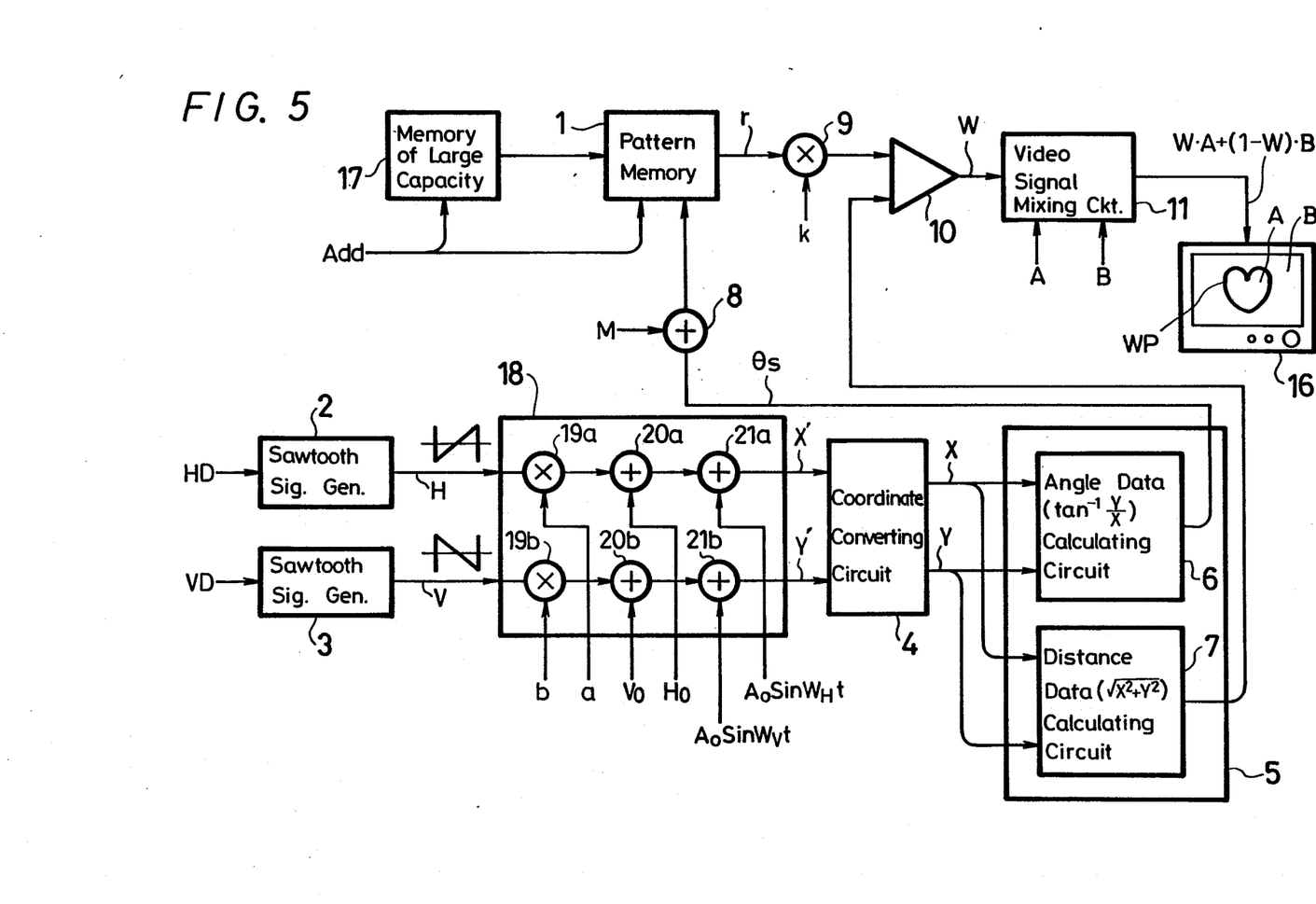
FIG. 5 is a block diagram showing another embodiment of a wipe pattern generator according to the present invention.

Another embodiment of the present invention that permits the use of the pattern memory 1 of large capacity will be described next with reference to a block diagram forming FIG. 5. In FIG. 5, like parts corresponding to those of FIG. 4 are marked with the same reference and therefore need not be described in detail.

The embodiment of FIG. 5 is different from that of FIG. 4 only in that there are provided a memory 17 of large storage capacity which is connected to the pattern memory 1 and a pattern adjusting circuit 18 as shown in FIG. 5.

Referring to FIG. 5, it will be seen that the memory 17 of large capacity which stores a lot of wipe patterns WP is connected to the pattern memory 1 as mentioned above. A transfer address Add is supplied to the memory 17 of large storage capacity and to the pattern memory 1. When supplied with the transfer address Add, the large capacity memory 17 transfers the necessary pattern data stored therein to the pattern memory 1 so that the pattern memory 1 generates the distance data r corresponding to the angle data $\theta_s$ supplied thereto through the adding circuit 8.

With the circuit arrangement shown in FIG. 5, even when the memory 17 of large storage capacity is provided to store therein a lot of wipe patterns WP, the processing speed of the wipe pattern generator can be prevented from being lowered.

The pattern adjusting circuit 18 is interposed between the sawtooth generating circuits 2, 3 and the coordinate converting circuit 4 to adjust the wipe pattern.

Referring to FIG. 5, the pattern adjusting circuit 18 is comprised of multiplying circuits 19a, 19b and adding circuits 20a, 20b, 21a and 21b. The sawtooth signal H from the sawtooth generating circuit 2 is supplied to the multiplying circuit 19a, in which it is multiplied with a coefficient a. The sawtooth signal V from the sawtooth generating circuit 3 is supplied to the multiplying circuit 19b, in which it is multiplied with a coefficient b. The aspect ratio of the wipe pattern is adjusted by the multiplying circuits 19a and 19b. The output signal from the multiplying circuit 19a is supplied to the adding circuit 20a, in which it is added with a signal $H_0$ that indicates an offset value of the position of the wipe pattern in the x direction. The output signal of the multiplying circuit 19b is supplied to the adding circuit 20b, in which it is added with a signal $V_0$ indicating an offset value of the position of the wipe pattern in the y direction. The output signal from the adding circuit 20a is supplied to the adding circuit 21a, and the output signal from the adding circuit 20b is supplied to the adding circuit 21b, respectively. The adding circuit 21a adds the output signal of the adding circuit 20a with a pattern modulation signal $A_0 \sin W_H t$, whereas the adding circuit 21b adds the output signal of the adding circuit 20b with a pattern modulation signal $A_0 \sin W_V t$. The adding circuits 21a and 21b generate, as a result, output signals X' and Y', respectively.

According to the present invention, since the wipe pattern is expressed by the polar coordinates, it is possible to enlarge or reduce the wipe pattern in size with ease by multiplying the distance data r from the pattern memory 1 with the magnification factor. Further, the wipe pattern can be rotated simply by adding the offset value to the angle data $\theta_s$.

Furthermore, since the wipe pattern is expressed by the polar coordinates as described above, this may allow a memory of relatively small storage capacity to store the wipe patterns.

The principle in which a soft wipe pattern signal WP' is formed from the wipe pattern WP expressed by the polar coordinates will be described with reference to FIG. 6.

Figure 6:
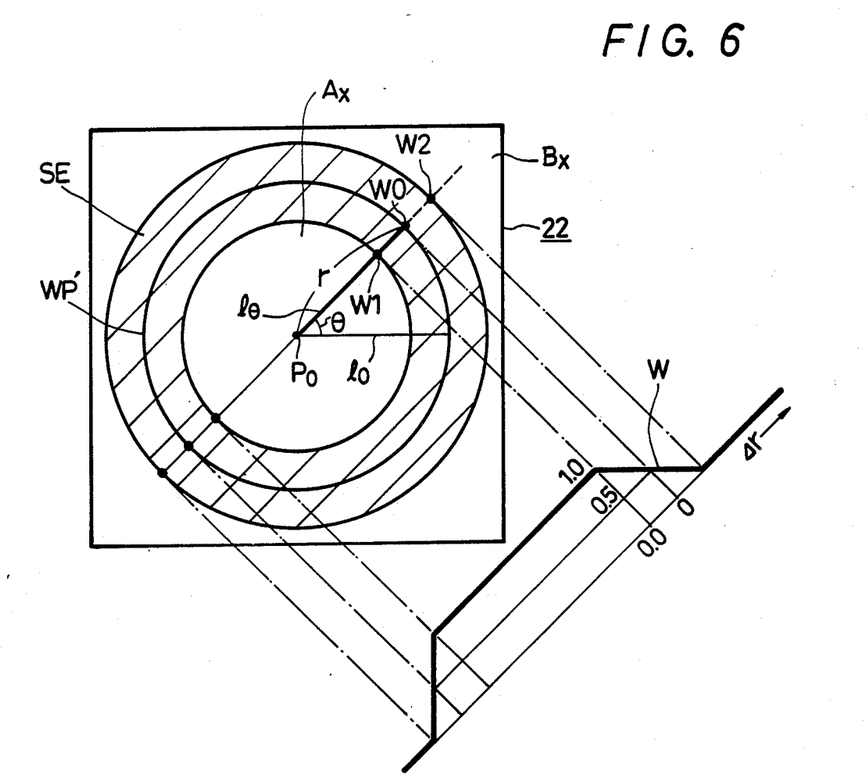
FIGS. 6 and 7 are respectively schematic diagrams used to explain a principle which enables the wipe pattern generator of the invention to generate a soft wipe pattern.

FIG. 6 is a schematic diagram used to explain the principle by which the soft wipe pattern signal WP' is generated from the wipe pattern WP.

In FIG. 6, reference numeral 22 designates a display screen, reference letter Ax designates a video portion of a circular shape formed by the video signal A and Bx designates a video portion formed by the video signal B. A hatched portion of annular shape is a soft edge portion that is represented by reference letter SE, and a wipe pattern WP' is coaxial with the video portion Ax and the contour thereof lies within the soft edge portion SE. The reference point $P_0$ is located at the center of the video portion Ax. Reference letter $l_0$ designates a reference line, $l_\theta$ designates a straight line which passes through the reference point $P_0$ and which forms an angle $\theta$ relative to the reference line $l_0$. $W_0$ designates an intersection at which the straight line $l_\theta$ intersects the contour of the wipe pattern WP', $W_1$ designates an intersection at which the straight line $l_\theta$ intersects the contour of the video portion Ax and $W_2$ designates an intersection at which the straight line $l_\theta$ intersects the border between the soft edge portion SE and the video portion Bx.

According to the above-mentioned arrangement, the position data (X, Y) of a pixel on the straight line $l_\theta$ are converted to polar coordinates $(\theta, \sqrt{X^2+Y^2})$ where the reference point $P_0$ assumes the original point and the $l_0$ assumes the reference line. A difference $\Delta r$ between the distance r from the original point $P_0$ to the intersection $W_0$ and the distance data $\sqrt{X^2+Y^2}$ is calculated. When the point defined by the polar coordinates $(\theta, \sqrt{X^2+Y^2})$ lies in the video portion $A_x$, or when the difference $\Delta r$ is smaller than the calculated result that is provided by subtracting r from the distance between the original point $P_0$ and the intersection $W_1$, the level of the soft wipe pattern signal W is presented as, for example, 1.0. When the point defined by the polar coordinates $(\theta, \sqrt{X^2+Y^2})$ lies in the video portion $B_x$, or when the difference $\Delta r$ is larger than the calculated result that is provided by subtracting r from the distance between the original point $P_0$ and the intersection $W_2$, the level of the soft wipe pattern signal W is presented as, for example, 0.0. When the point defined by the polar coordinates $(\theta, \sqrt{X^2+Y^2})$ approaches from the intersection $W_1$ to the intersection $W_0$, the level of the soft wipe pattern signal W is gradually decreased. When the point defined by the polar coordinates $(\theta, \sqrt{X^2+Y2})$ equals the intersection $W_0$, or when the difference $\Delta r$ is zero, the level of the soft wipe pattern signal W becomes, for example, 0.5. When the point defined by the polar coordinates $(\theta, \sqrt{X^2+Y^2})$ approaches to the intersection $W_2$ from the intersection $W_0$, the level of the soft wipe pattern signal W is gradually decreased. When the point defined by the polar coordinates $(\theta, \sqrt{X^2+Y^2})$ equals the intersection $W_2$, the level of the soft wipe pattern signal W becomes 0.0.

Figure 7:
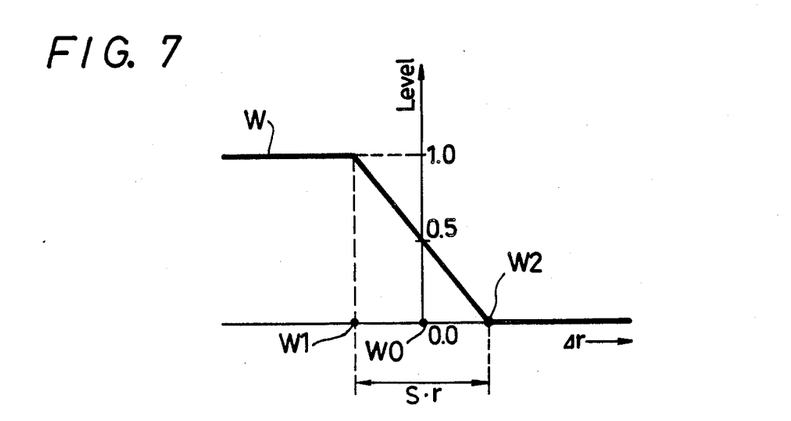

FIG. 7 is a schematic diagram showing a relationship between the level of the soft wipe pattern signal W and the distance difference $\Delta r$ in a range from the intersection $W_1$ to the intersection $W_2$.

In FIG. 7, the soft wipe pattern signal W between the intersections $W_1$ and $W_2$ can be expressed by an equation of straight line that is given as the following equation (1).

$$W = -\{1/(S \cdot r)\}\Delta r + 0.5 \qquad (1)$$

Where the distance between the intersections $W_1$ and $W_2$ is represented by $S \cdot r$ which will be described later.

Since $\Delta r$ is the difference between the distance from the point $P_0$ to the point defined by $(\theta, \sqrt{X^2+Y^2})$ and the distance r, $\Delta r$ can be rewritten as $\Delta r = \sqrt{X^2+Y^2} - r$. Hence, substituting $\Delta r = \sqrt{X^2+Y^2} - r$ into the equation (1) yields the following equation (2).

$$W = -\{1/(S \cdot r)\}(\sqrt{X^2+Y^2} - r) + 0.5 \qquad (2)$$

$$= -(1/S)(\sqrt{X^2+Y^2}/r - 1) + 0.5$$

When the wipe pattern WP' is increased or reduced in size, the distance r is multiplied with a variable coefficient k. Therefore, considering the variable coefficient k, if $\Delta r = \sqrt{X^2+Y^2} - k \cdot r$ is employed, the equation (2) becomes the following equation (3).

$$W = -(1/S)(\sqrt{X^2+Y^2}/r - k) + 0.5 \qquad (3)$$

While the distance between the intersections $W_1$ and $W_2$ is represented by $S \cdot r$, S is the variable coefficient so that it may be represented as a ratio of the width of the soft edge portion SE relative to the distance r. The width of the soft edge portion SE can also be freely varied by altering the coefficient S. The coefficients S and k are not related to each other so that even when the wipe pattern WP is increased or reduced in size by altering the coefficient k, the width of the soft edge portion SE is not changed so long as the coefficient S is not altered.

As mentioned above, the soft wipe pattern signal W is made 1.0 when the distance $\sqrt{X^2+Y^2}$ is shorter than the distance between the intersection $W_1$ and the point $P_0$. When the distance $\sqrt{X^2+Y^2}$ is longer than the distance between the intersection $W_2$ and the point $P_0$, the soft wipe pattern signal W is made 0.0. When the distance $\sqrt{X^2+Y^2}$ is longer than the distance between the intersection $W_1$ and the point $P_0$ and is shorter than the distance between the intersection $W_2$ and the point $P_0$, the soft wipe pattern signal W is provided in accordance with the above-mentioned equation (3).

Figure 8:
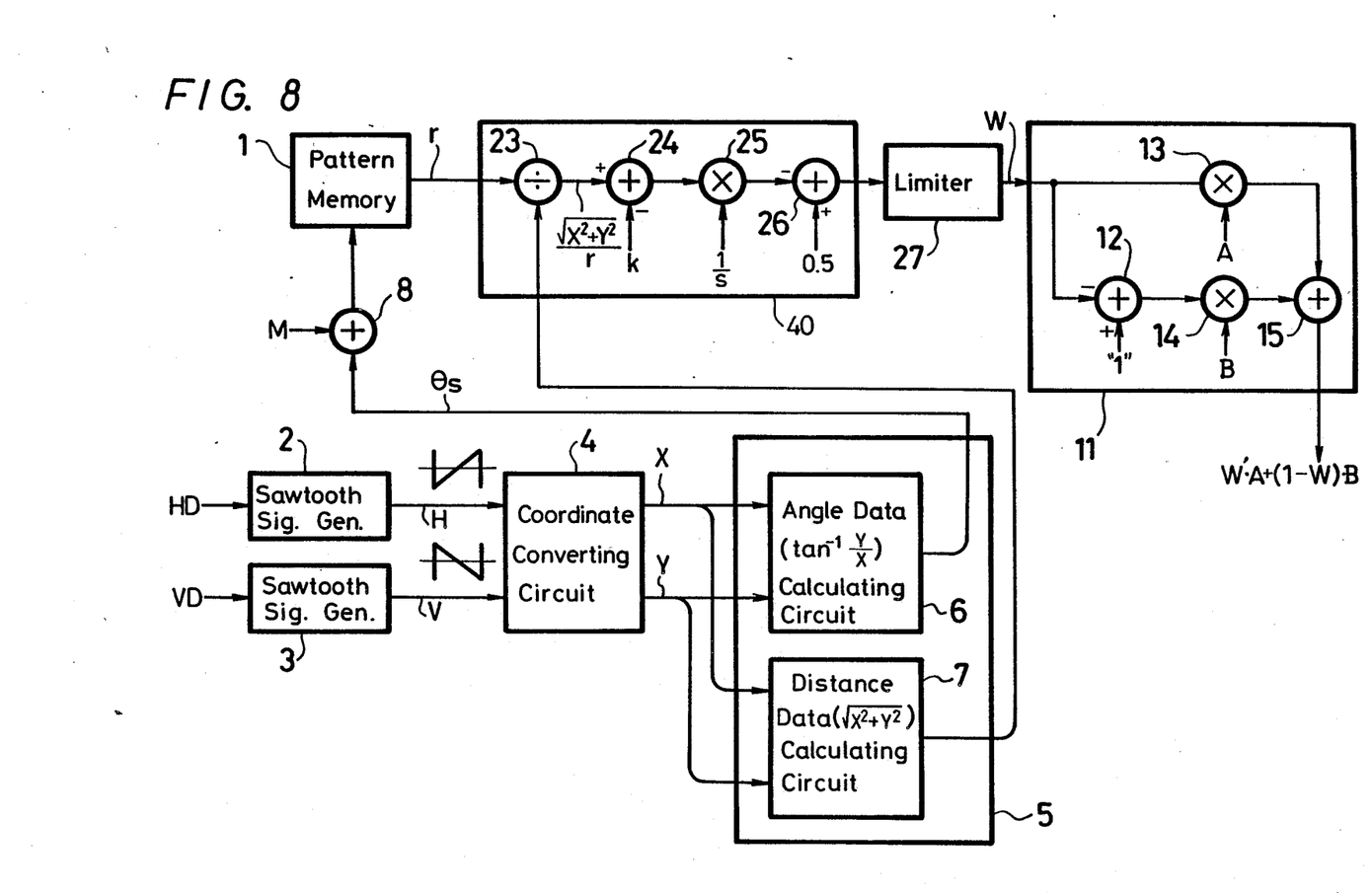
FIGS. 8, 9, 10 and 11 are block diagrams showing further embodiments of a wipe pattern generator according to the present invention, respectively.

FIG. 8 is a block diagram showing a further embodiment of the present invention that utilizes the above-mentioned principle of the present invention. In FIG. 8, like parts corresponding to those of the preceding embodiments are marked with the same references and therefore need not be described in detail.

Referring to FIG. 8, it will be seen that the sawtooth signals H and V from the sawtooth generating circuits 2 and 3 are supplied to the coordinate converting circuit 4, in which they are converted to (X, Y) data indicating the position of each pixel on the monitor screen in the polar coordinate system wherein the above reference point $P_0$ is represented as the original point. The (X, Y) data thus converted are supplied to the angle calculating circuit 6 and the distance calculating circuit 7 which constitute the polar coordinate converting circuit 5. The angle calculating circuit 6 calculates angle data $\theta_s = \tan^{-1}(Y/X)$ from the signals X and Y supplied thereto, and supplies the resultant angle data $\theta_s$ to the adding circuit 8. The adding circuit 8 adds, when the wipe pattern is rotated, the address offset value M, which is the rotation angle information, to the angle data $\theta_s$. The angle data $\theta_s$ is supplied from the adding circuit 8 to the pattern memory 1 as address data.

As earlier noted, the pattern memory 1 generates the distance data r corresponding to the angle data $\theta_s$ supplied thereto.

The distance data r is supplied to a computing circuit 40 which is comprised of a dividing circuit 23, an adding circuit 24, a multiplying circuit 25 and an adding circuit 26 which will be described later. The distance data r is first supplied to the dividing circuit 23 in the computing circuit 40. The dividing circuit 23 is supplied with the distance data $\sqrt{X^2+Y^2}$ from the distance calculating circuit 7 and the dividing circuit 23 therefore calculates $\sqrt{X^2+Y^2}/r$. Then, the signal indicating $\sqrt{X^2+Y^2}/r$ is supplied to the adding circuit 24, in which it is added with a coefficient $-k$ to generate $\sqrt{X^2+Y^2}/r - k$. The signal indicative of $\sqrt{X^2+Y^2}/r - k$ is supplied to the multiplying circuit 25, in which it is multiplied with $1/S$ and is thereby generated as a signal indicating $(1/S) \cdot (\sqrt{X^2+Y^2}/r - k)$. This signal indicating $(1/S)(\sqrt{X^2+Y^2}/r - k)$ is fed to the adding circuit 26 which generates $-(1/S)(\sqrt{X^2+Y^2}/r - k) + 0.5$ that was expressed in the equation (3). Then, the signal indicating $-(1/S)(\sqrt{X^2+Y^2}/r - k) + 0.5$ is supplied to a limiter 27. The limiter 27 limits the level of the signals supplied thereto from the adding circuit 26 so that it generates "1" with respect to signals of level higher than "1" and "0" with respect to signals of level lower than "0" supplied from the adding circuit 26. The limiter 27 generates, as a result, the soft wipe pattern signal W shown in FIG. 6.

The soft wipe pattern signal W is supplied to the adding circuit 12 and to the multiplying circuit 13 which constitute the video mixing circuit 11. The wipe pattern signal W supplied to the adding circuit 12 is processed to provide the signal 1−W. The signal 1−W is supplied to the multiplying circuit 14, in which it is multiplied with the video signal B to generate the signal (1−W)·B. The signal (1−W)·B is fed to the adding circuit 15. The pattern signal W supplied to the multiplying circuit 13 is multiplied with the video signal A so as to provide the signal W·A. The signal W·A is supplied to the adding circuit 15, in which it is added to the above-mentioned signal (1−W)·B. Hence, the adding circuit 15 derives a signal W·A+(1−W)·B.

On the basis of the signal W·A+(1−W)·B, the soft wipe pattern as, for example, shown in FIG. 6 is formed as a result.

Figure 9:
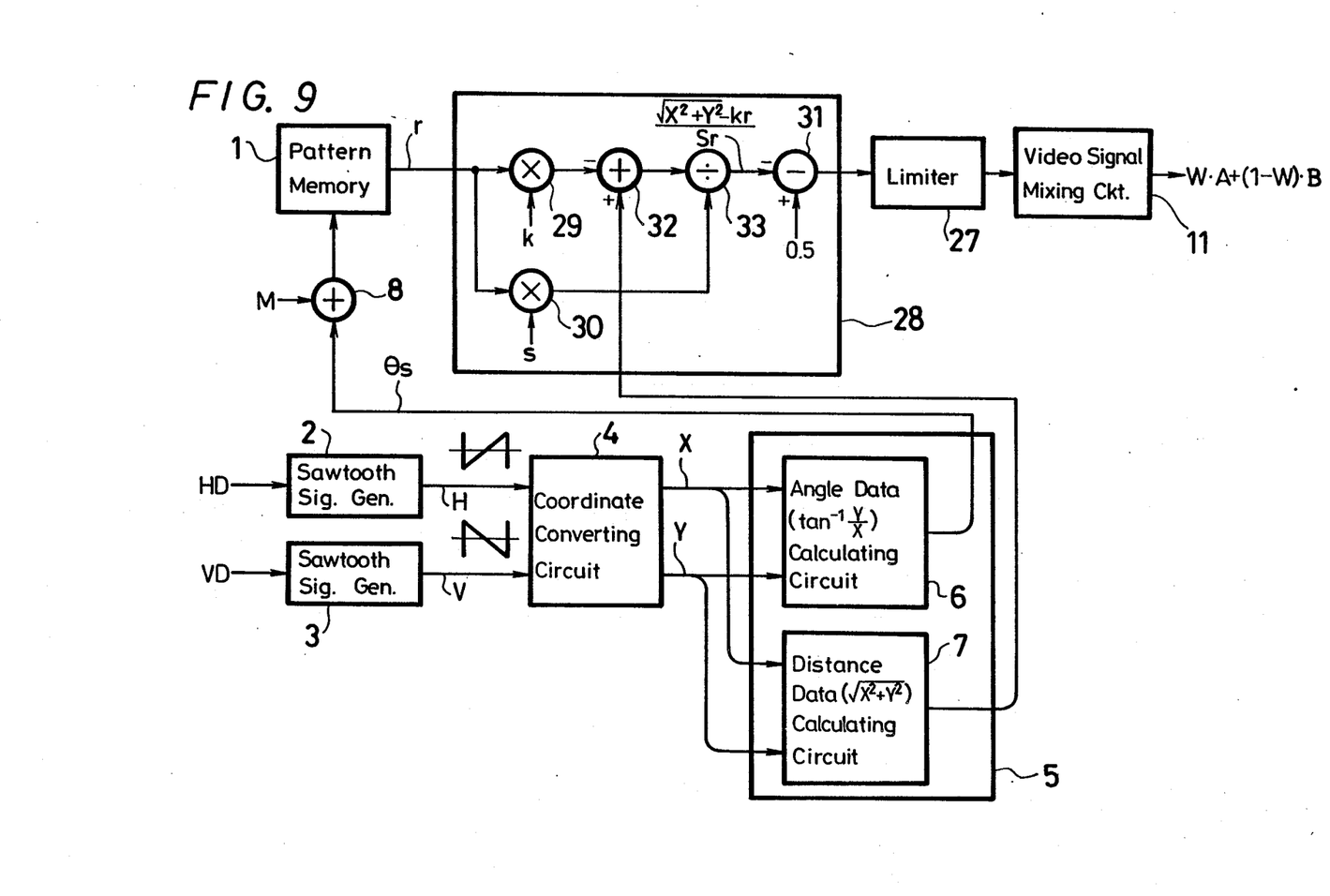

FIG. 9 is a schematic diagram in block form of a further embodiment of the wipe pattern generator according to the present invention. In FIG. 9, like parts corresponding to those of FIG. 8 are marked with the same references. FIG. 9 is different from FIG. 8 only in the circuit arrangement of the computing circuit which computes the afore-noted equation (3).

Referring to FIG. 9, it will be seen that the distance data r of the pattern memory 1 is supplied to a computing circuit 28. The computing circuit 28 is comprised of multiplying circuits 29, 30, adding circuits 31, 32 and a dividing circuit 33. First, the distance data r is supplied to the multiplying circuits 29 and 30 in the computing circuit 28. The multiplying circuit 29 multiplies the distance data r with the coefficient k, whereas the multiplying circuit 30 multiplies the distance data r with the coefficient S. A multiplied result kr from the multiplying circuit 29 is fed to the adding circuit 32. The adding circuit 32 is supplied with the output data $\sqrt{X^2+Y^2}$ from the distance calculating circuit 7. The adding circuit 32 produces $\sqrt{X^2+Y^2}-kr$ which is fed to the dividing circuit 33. The dividing circuit 33 is supplied with the multiplied result Sr from the multiplying circuit 30 and the dividing circuit 33 therefore produces $(1/Sr)(\sqrt{X^2+Y^2}-kr)$. The output data from the dividing circuit 33 is supplied to the adding circuit 31 which generates $-(1/Sr)(\sqrt{X^2+Y^2}-kr)+0.5$.

Alternatively, in the embodiment of FIG. 8, reciprocal number data 1/r of the distance data r corresponding to the angle data $\theta_s$ may be stored in the pattern memory 1 and the reciprocal number data 1/r may be delivered from the pattern memory 1 in response to the output signal from the adding circuit 8. If so, only a multiplying circuit for multiplying (1/r) and $\sqrt{X^2+Y^2}$ is required instead of the dividing circuit 23, which can remove the dividing circuit whose circuit arrangement is complicated.

Figure 10:
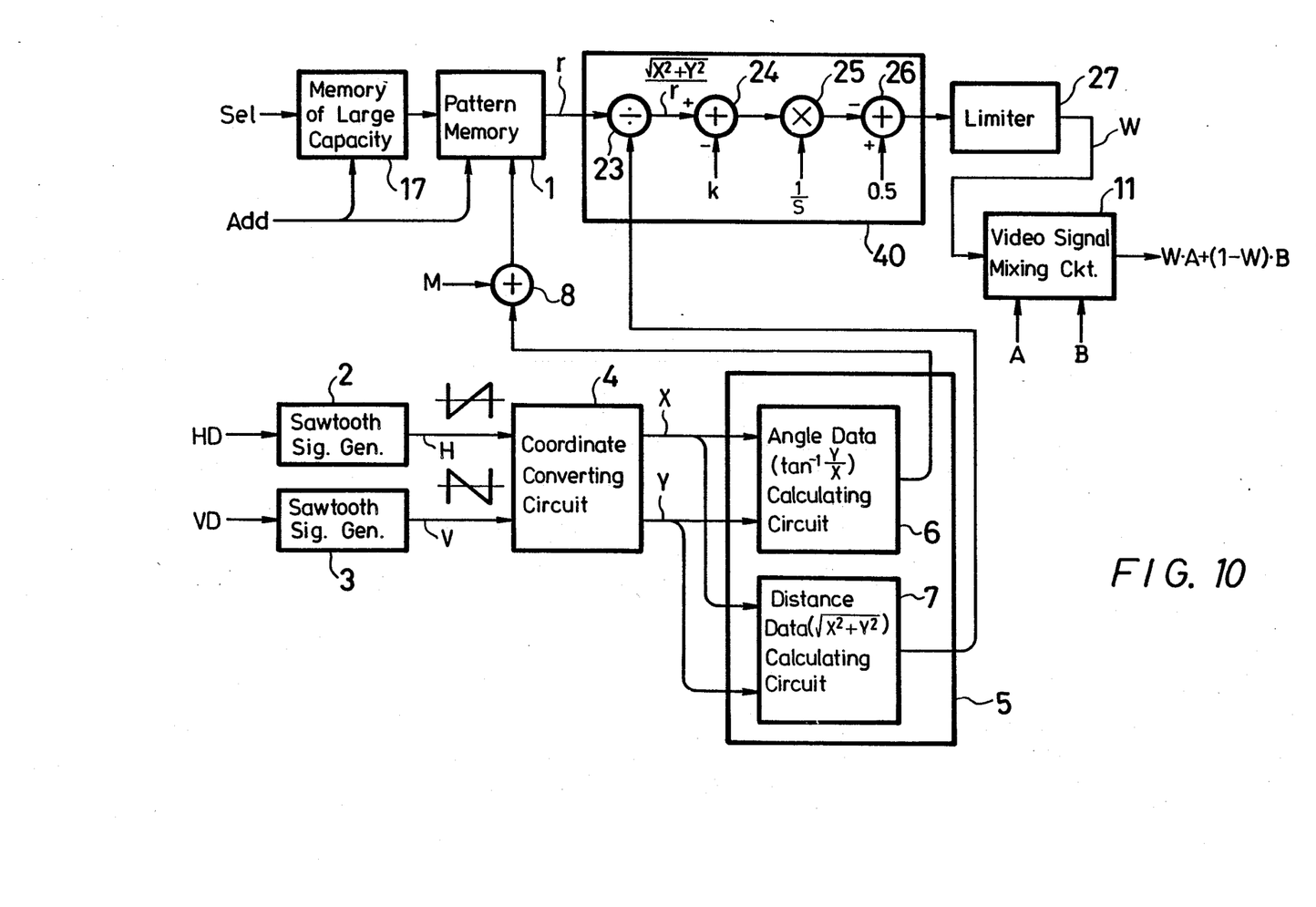

FIG. 10 is a block diagram showing a further embodiment of the wipe pattern generator according to the present invention. The embodiment shown in FIG. 10 is different from that shown in FIG. 8 only in that the embodiment of FIG. 10 further employs the memory 17 of large capacity.

Referring to FIG. 10, there is shown the memory 17 of large capacity in which a lot of various types of wipe patterns are stored. The transfer address Add is transferred to the memory 17 of large capacity and to the pattern memory 1. The transfer address Add is supplied to the memory 17 of large capacity and a wide pattern selection address Sel is also supplied to the memory 17, whereby the memory 17 transfers necessary pattern data stored therein to the pattern memory 1. The pattern memory 1 therefore generates the distance data r corresponding to the angle data $\theta_s$ supplied thereto from the adding circuit 8.

With the circuit arrangement shown in FIG. 10, even when the memory 17 of large capacity is used to store a lot of wipe patterns, only the necessary wipe pattern data is transferred to the pattern memory 1 during one field period, thereby preventing the processing speed of the wipe pattern generator from being lowered.

Alternatively, it is possible to connect a circuit for performing the conversion of an aspect ratio and for performing the addition of a pattern modulation signal to the preceding or succeeding stage of the coordinate converting circuit 4.

Further, while the computing circuits 28 and 40 are constructed as shown in FIGS. 9 and 10 in the above-mentioned embodiments, they are not limited to those shown in FIGS. 9 and 10 but they may be modified so long as they can perform the computation of equation (3).

According to the present invention, in the wipe pattern generator for generating the wipe pattern by using the memory in which the wipe patterns are stored, the wipe pattern is expressed by the polar coordinates and the wipe pattern data expressed by the polar coordinates is computed to provide the soft wipe pattern data so that the soft wipe pattern data can be generated by the simplified circuit arrangement with ease.

Further, since the wipe pattern is expressed by the polar coordinates, the wipe pattern can easily be increased or reduced in size by changing the magnification k of the distance data r derived from the pattern memory.

Furthermore, the wipe pattern can be rotated by adding the address offset value M to the angle data $\theta_s$.

Figure 11:
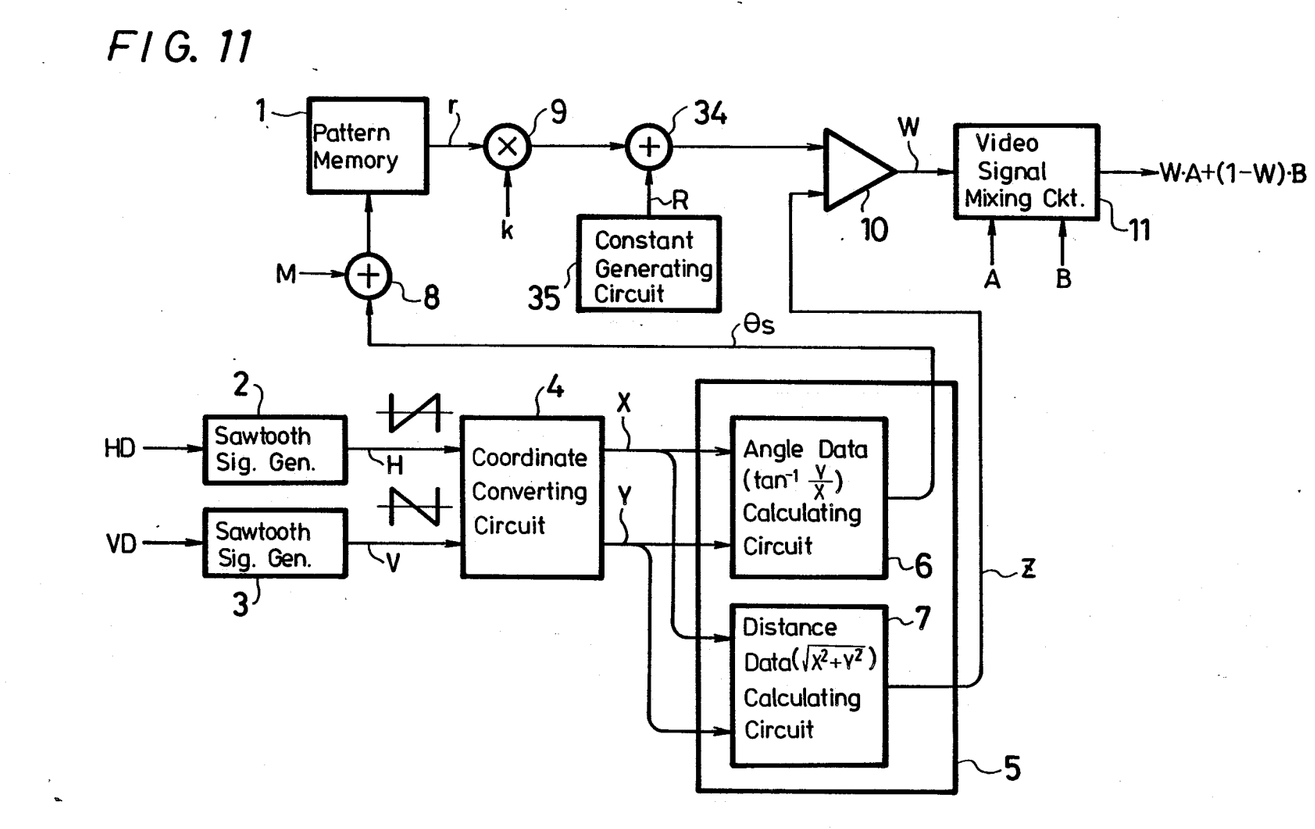

A further embodiment of the present invention in which the size of the wipe pattern can freely be changed will be described with reference to a block diagram forming FIG. 11. In FIG. 11, like parts corresponding to those of preceding embodiments are marked with the same references.

Referring to FIG. 11, it will be seen that the signals X and Y indicating the position of each pixel on the monitor screen are converted by the coordinate converting circuit 4 in such a manner that the above reference point P$_0$ is presented as the original point. The signals X and Y are supplied to the angle calculating circuit 6 and to the distance calculating circuit 7 which constitute the polar coordinate converting circuit 5. The angle calculating circuit 6 calculates the angle data $\theta_s = \tan^{-1}(Y/X)$ from the signals X and Y. The resultant angle data $\theta_s$ is fed to the adding circuit 8. The adding circuit 8 adds, when the wipe pattern is rotated, the address offset value M which is the rotation angle information, to the angle data $\theta_s$. The resultant angle data $\theta_s$ from the adding circuit 8 is supplied to the pattern memory 1 as the address data.

The pattern memory 1 stores the polar coordinate data (see FIG. 2) as mentioned before so that the pattern memory 1 generates the distance data r corresponding to the angle data $\theta_s$ supplied thereto. The distance data r is then fed to the multiplying circuit 9, in which it is multiplied with a predetermined constant k. The multiplied result from the multiplying circuit 9 is supplied to an adding circuit 34. In the adding circuit 34, the resultant distance data r is added with a constant R generated from a constant generating circuit 35, and the added value (r +R) is supplied to one input terminal of the comparing circuit 10. The comparing circuit 10 is supplied at the other input terminal thereof with data which indicates the distance between the reference point $P_0$ and the point defined by the coordinates (X, Y), or the data calculated as $Z=\sqrt{X^2+Y^2}$ by the distance calculating circuit 7. The comparing circuit 10 generates a signal which goes to "1" (high level) if r+R>Z and to "0" (low level) if r+R<Z.

Figure 12A:
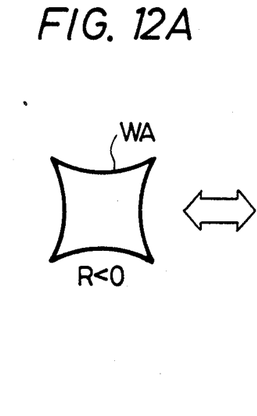
FIGS. 12A, 12B, 12C, FIGS. 13A, 13B, 13C and FIG. 14 are pictorial representations used to explain how the wipe patterns made by the wipe pattern generator of the invention are changed, respectively.
Figure 12B:
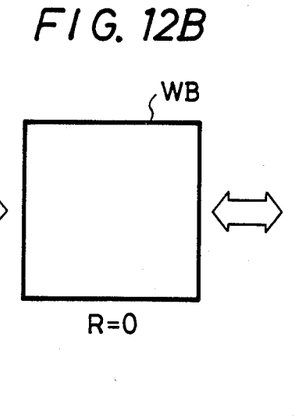

In the above circuit arrangement, let it be assumed that distance data r, which provides a square wipe pattern WB shown in FIG. 12B is stored in the pattern memory 1.

Figure 13A:
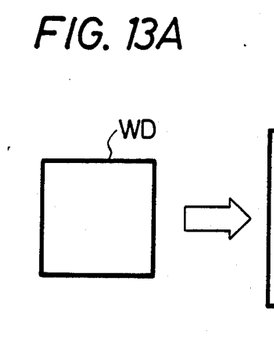
Figure 13B:
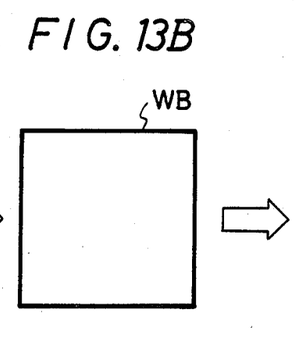
Figure 13C:
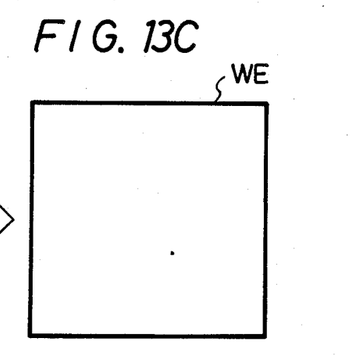

If R=0, then the data stored in the pattern memory 1 is directly supplied to the comparing circuit 10, whereby the wipe pattern output W of the comparing circuit 10 presents the wipe pattern WB shown in FIG. 12B. If the value of the coefficient k to be multiplied with the distance data r in the multiplying circuit 9 is varied, then the size of the square wipe pattern WB can be changed as shown in FIG. 13B to provide a small square wipe pattern WD shown in FOG. 13A or a large square wipe pattern WE shown in FIG. 13C.

Figure 12C:
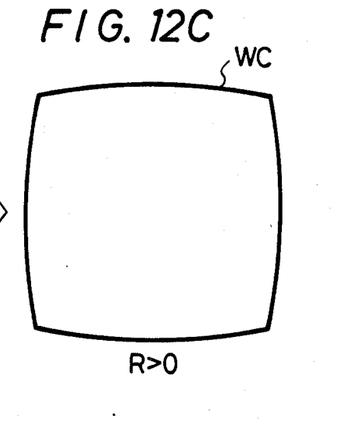
Figure 14:
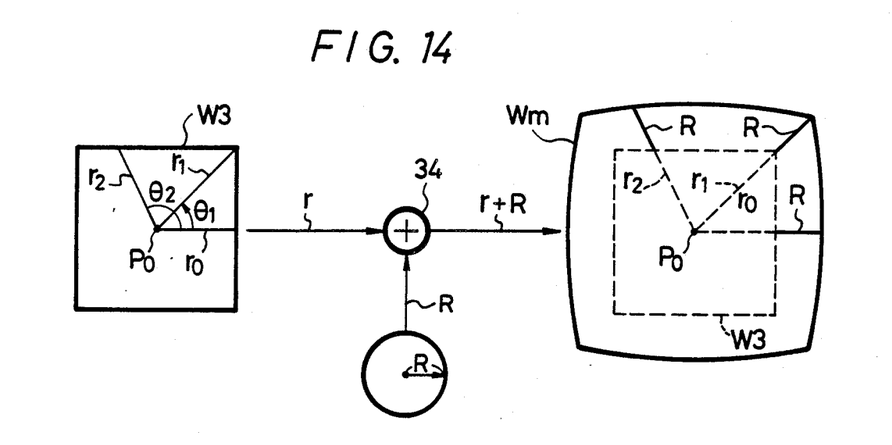

If R>0, as shown in FIG. 14, the constant R is added to each distance data r by the adding circuit 34, or the constant value R (shown by the solid line) is added to the distance data r (shown by a dashed line) regardless of the angle data $\theta_s$ as shown in the right portion of FIG. 14 so that the wipe pattern output from the comparing circuit 10 presents a wipe pattern WC of a barrel shape whose four sides are curved outwardly as shown in FIG. 12C.

If R<0, then the constant R is subtracted from each distance data r, whereby in exactly the opposite manner to that of R>0 the wipe pattern output of the comparing circuit 10 presents a wipe pattern WA of spool shape whose four sides are inwardly curved as shown in FIG. 12A.

In the case of R<0 or R>0, if the constant R and the coefficient k are varied while keeping a ratio between the product kr of the coefficient k with the distant data r and the constant R constant, only the size of the wipe pattern WC or WA is changed without changing its shape.

Alternatively, if the constant R is increased in a range of from R<0 to R>0 in accordance with the change of field, during the period in which the picture is changed, the shape of the wipe pattern can be sequentially changed in the order of, for example, the wipe patterns WA, WB and WC as shown in FIGS. 12A, 12B and 12C.

Figure 15:
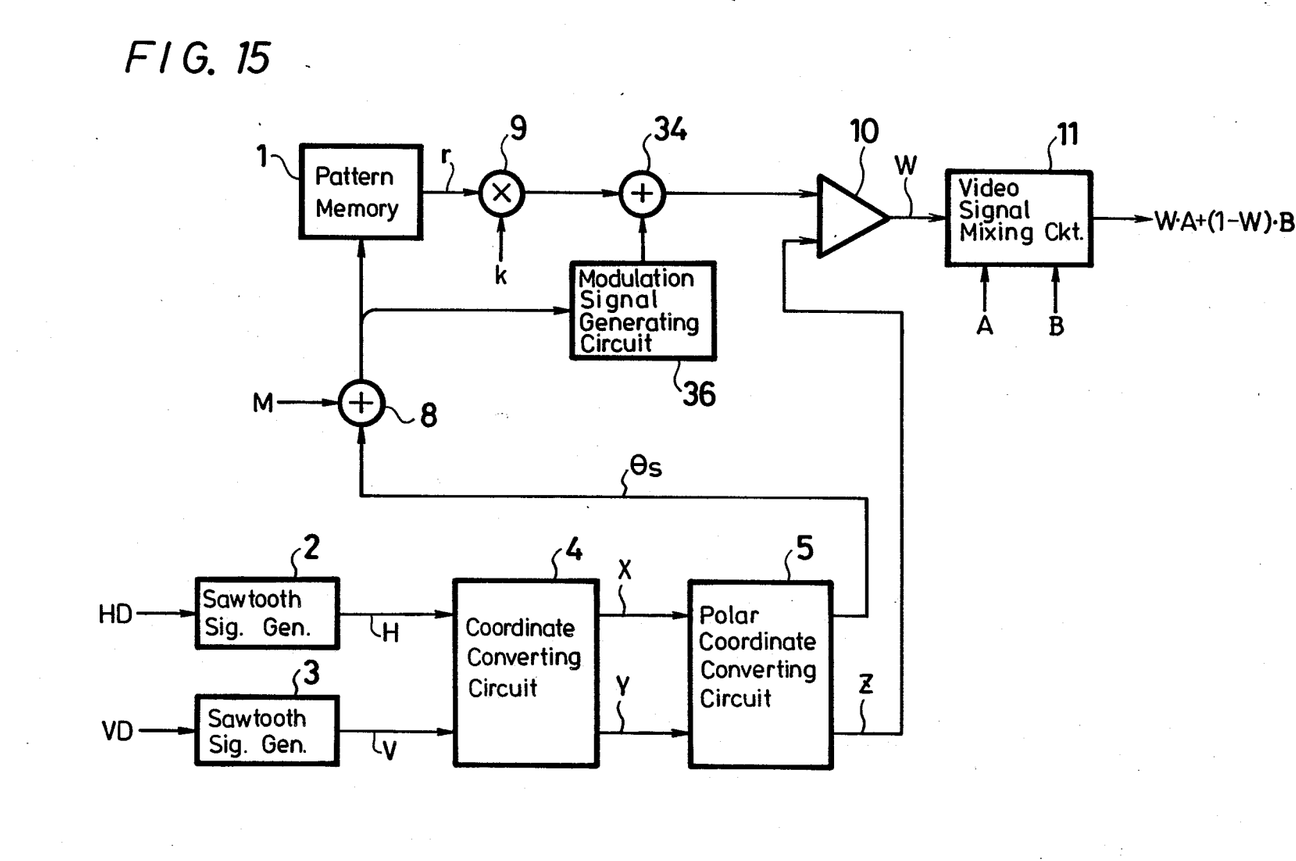
FIG. 15 is a schematic in block diagram form of a further embodiment of a wipe pattern generator according to the present invention.
Figure 16:
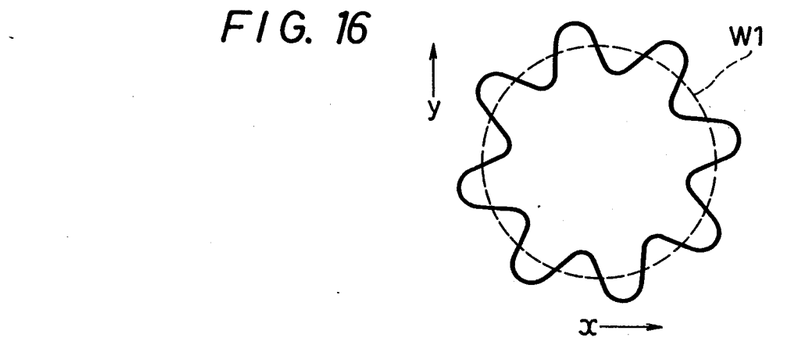
FIGS. 16 and 17 are schematic diagrams used to explain the operation of the wipe pattern generator shown in FIG. 15.

FIG. 15 is a block diagram showing yet a further embodiment of the wipe pattern generator according to the present invention. According to the embodiment shown in FIG. 15, the contour of the wipe pattern W1 is radially modulated as, for example, shown in FIG. 16.

In the embodiment shown in FIG. 15, the constant generating circuit 35 shown in FIG. 11 is replaced with a modulating signal generating circuit 36.

Referring to FIG. 15, it will be seen that the angle data $\theta_s$ from the polar coordinate converting circuit 5 is supplied through the adding circuit 8 to the modulating signal generating circuit 36, and the modulating circuit 36 generates a modulating signal $\beta$ expressed as $$\beta = A \sin n\theta s$$

where A and n are given constants.

This modulating signal from the circuit 36 is supplied to the adding circuit 34, in which the modulating signal $A \sin n\theta s$ is added to the distance data r from the pattern memory 1. Then, the added output from the adding circuit 34 is supplied to the comparing circuit 10.

Figure 17:
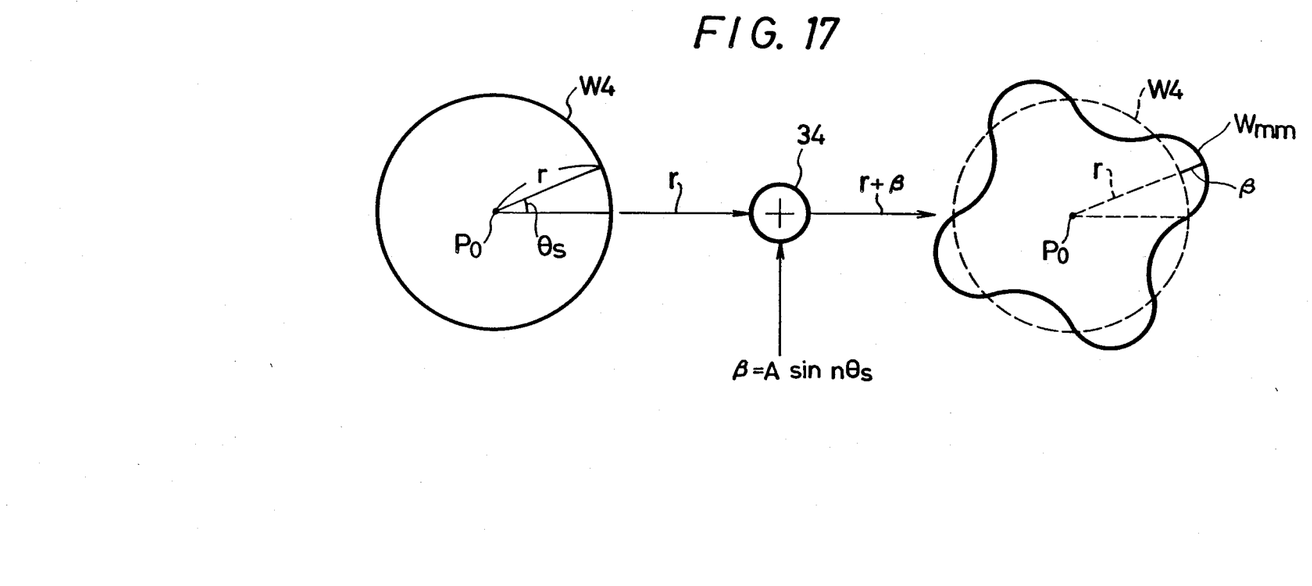

With the above-mentioned circuit arrangement, if distance data r, which provides a circular wipe pattern W4 shown in FIG. 17, is stored in the pattern memory 1, the modulating signal $\beta$ (shown by a solid line on the right side in FIG. 17) is added to each distance data r (shown by a dashed line on the right of FIG. 17). Thus, as shown in FIG. 17, the wipe pattern output signal of the comparing circuit 10 presents, as a result, a modulated wipe pattern Wmm in which the distance r+$\beta$ between the contour of the wipe pattern Wmm and the reference point $P_0$ is cyclically changed in response to the angle $\theta_s$.

Changing the coefficient k supplied to the multiplying circuit 9, it is possible to vary the size of the wipe pattern Wmm.

While the constant n in the wipe pattern Wmm is "4", it is needless to say that the constant n can be freely changed. Further, the constant n is not limited to an integer but may be a number having a decimal point. In this case, 360 degrees do not provide the terminating point of a period in which the modulating signal $\beta$ is changed so that the wipe pattern Wmm can be rotated.

Further, changing the value of the constant A, it is possible to vary the degree in which the contour of the wipe pattern Wmm is radially modulated.

Furthermore, the modulating signal $\beta$ added to the distance data r is not limited to the sine wave signal but it may be a triangular wave signal, a sawtooth signal or the like.

In addition, such a modification of the present invention is also possible that the embodiments shown in FIGS. 11 and 15 are combined to add the constant R and the modulating signal $A \sin n\theta s$ to the distance data r, thereby generating a wipe pattern.

According to the present invention, as set out above, since the constant R is added to the distance data r expressed by the polar coordinates, the shape of the wipe pattern can easily be changed without changing the data stored in the pattern memory.

Further, since the modulating signal such as the sine wave signal is added to the distance data r expressed by the polar coordinates, it is possible to easily generate a wipe pattern of which the contour is radially modulated.

Furthermore, since the wipe pattern is expressed by the polar coordinates, adding the address offset value M to the angle data $\theta_s$, the wipe pattern can be rotated with ease unlike the case of the orthogonal coordinates which require the complex computation using a trigonometrical function.

Having described the preferred embodiments of the invention with reference to the accompanying drawings, it is to be understood that the present invention is not limited to those precise embodiments, and that various changes and modifications may be effected therein by one with ordinary skill in the art without departing from the scope or spirit of the invention as defined in the appended claims.

I claim as my invention:

1. A wipe pattern generator for generating a wipe pattern signal on the basis of stored wipe pattern data for displaying video signals on a display screen, comprising:
   (a) memory means for storing data expressed in polar coordinates to indicate a contour of a wipe pattern;
   (b) pixel position designating means for generating angle data and distance data indicating a position of each pixel of said display screen in a polar coordinate system; and
   (c) means for forming a wipe pattern signal on the basis of data indicating a contour of said wipe pattern derived from said memory means based on said angle data and said distance data.

2. A wipe pattern generator according to claim 1, wherein said memory means comprises a memory having a capacity for storing data in polar coordinates that indicates a plurality of contours of respective wipe patterns and a pattern memory for storing one contour of a wipe pattern, one contour of a wipe pattern being selectively read from said memory into said pattern memory.

3. A wipe pattern generator for generating a wipe pattern signal on the basis of stored wipe pattern data for displaying video signals on a display screen, comprising:
   (a) memory means for storing first angle data and first distance data in a predetermined relationship, said first angle data indicating an angle between an imaginary reference straight line passing through a reference point within a wipe pattern and a predetermined point on the contour of said wipe pattern and an imaginary straight line passing through said reference point and a given point on the contour of said wipe pattern, said first distance data indicating a distance between said reference point and said given point;
   (b) pixel position designating means for generating second distance data between each pixel of the display screen and said reference point and second angle data indicating an angle between an imaginary straight line passing through said reference point and said each pixel and said imaginary reference straight line;
   (c) adding means for adding a predetermined offset value to said second angle data; and
   (d) forming means for forming a wipe pattern signal according to said first distance data derived from said memory means on the basis of an output signal from said adding means and said second distance data.

4. A wipe pattern generator for generating a wipe pattern signal on the basis of stored wipe pattern data for displaying video signals on a display screen, comprising:
   (a) memory means for storing first angle data and first distance data in a predetermined relationship, said first angle data indicating an angle between an imaginary reference straight line passing through a reference point within a wipe pattern and a predetermined point on the contour of said wipe pattern and an imaginary straight line passing through said reference point and a given point on the contour of said wipe pattern, said first distance data indicating a distance between said reference point and said given point;
   (b) pixel position designating means for generating second distance data between each pixel of said display screen and said reference point and second angle data indicating an angle between an imaginary straight line passing through said reference point and said each pixel and said imaginary reference straight line; and
   (c) means for forming a wipe pattern signal according to said first distance data derived from said memory means on the basis of said second angle data and said second distance data.

5. A wipe pattern generator according to claim 4, wherein said forming means generates a wipe pattern signal whose level is gradually changed within a predetermined range on the basis of a difference between said first and second distance data.

6. A wipe pattern generator according to claim 4, wherein said forming means comprises adding means for adding said first distance data with data whose value is changed in response to said second angle data and comparing means for comparing in level an output signal of said adding means and said second distance data to generate a signal of first or second level on the basis of the compared result from said comparing means.

7. A wipe pattern generator according to claim 4, wherein said forming means comprises dividing means for dividing said first distance data by said second distance data, first adding means for adding a first predetermined value to data output by the dividing means, multiplying means for multiplying the output of the first adding means by a second predetermined value, second adding means for adding a third predetermined value to the output of the multiplying means, and further comprising means for limiting the output of the second adding means to less than a fourth predetermined value.

8. A wipe pattern generator according to claim 4, wherein said forming means comprises first multiplying means for multiplying said first distance data by a first predetermined value, second multiplying means for multiplying said first distance data by a second predetermined value, adding means for adding the output from the first multiplying means to the said second distance data, dividing means for dividing the output of the adding means by the output of the second multiplying means, subtracting means for subtracting a third predetermined value from the output of the dividing means and further comprising means for limiting the output of the subtracting means to less than a fourth predetermined value.

9. A wipe pattern generator according to claim 4, wherein said forming means comprises combining means for combining data of a predetermined value with said first distance data and comparing means for comparing an output signal of said combining means and said second distance data to generate a signal of a first or second level on the basis of the compared result from said comparing means.

10. A wipe pattern generator according to claim 9, wherein said combining means includes multiplying means for multiplying said first distance data by a predetermined value.

11. A wipe pattern generator according to claim 4, wherein said pixel position designating means comprises sawtooth signal generating means for generating a signal representing the horizontal position of each pixel of said display screen, sawtooth signal generating means for generating a signal representing the vertical position of each pixel of said display screen, combining means for altering the generated horizontal and vertical position signals of each pixel of said display screen, and converting means for converting the altered horizontal and vertical position signals into said second angle data and said second distance data.

12. A wipe pattern generator according to claim 11, wherein said combining means comprises first multiplying means for multiplying the horizontal position signal of each pixel by a first predetermined value, second multiplying means for multiplying the vertical position signal of each pixel by a second predetermined value, first adding means for adding a third predetermined value to the output of the first multiplying means, second adding means for adding a fourth predetermined value to the output of the second multiplying means, third adding means for adding the output of the first adding means to a first modulating value, fourth adding means for adding the output of the second adding means to a second modulating value, and coordinate converting means for converting the output of the third adding means and the output of the fourth adding means into said altered horizontal and vertical position signals.

13. A wipe pattern generator according to claim 11, wherein said converting means comprises angle data calculating means for converting said altered horizontal and vertical positions into said second angle data, and distance data calculating means for converting said altered horizontal and vertical position signals into said second distance data.

14. A wipe pattern generator according to claim 4, wherein said combining means includes adding means for adding data of a predetermined value to said first distance data.

* * * * *